(No Model.)
R. HAYDEN.
TRY SQUARE.
No. 392,426. Patented Nov. 6, 1888.
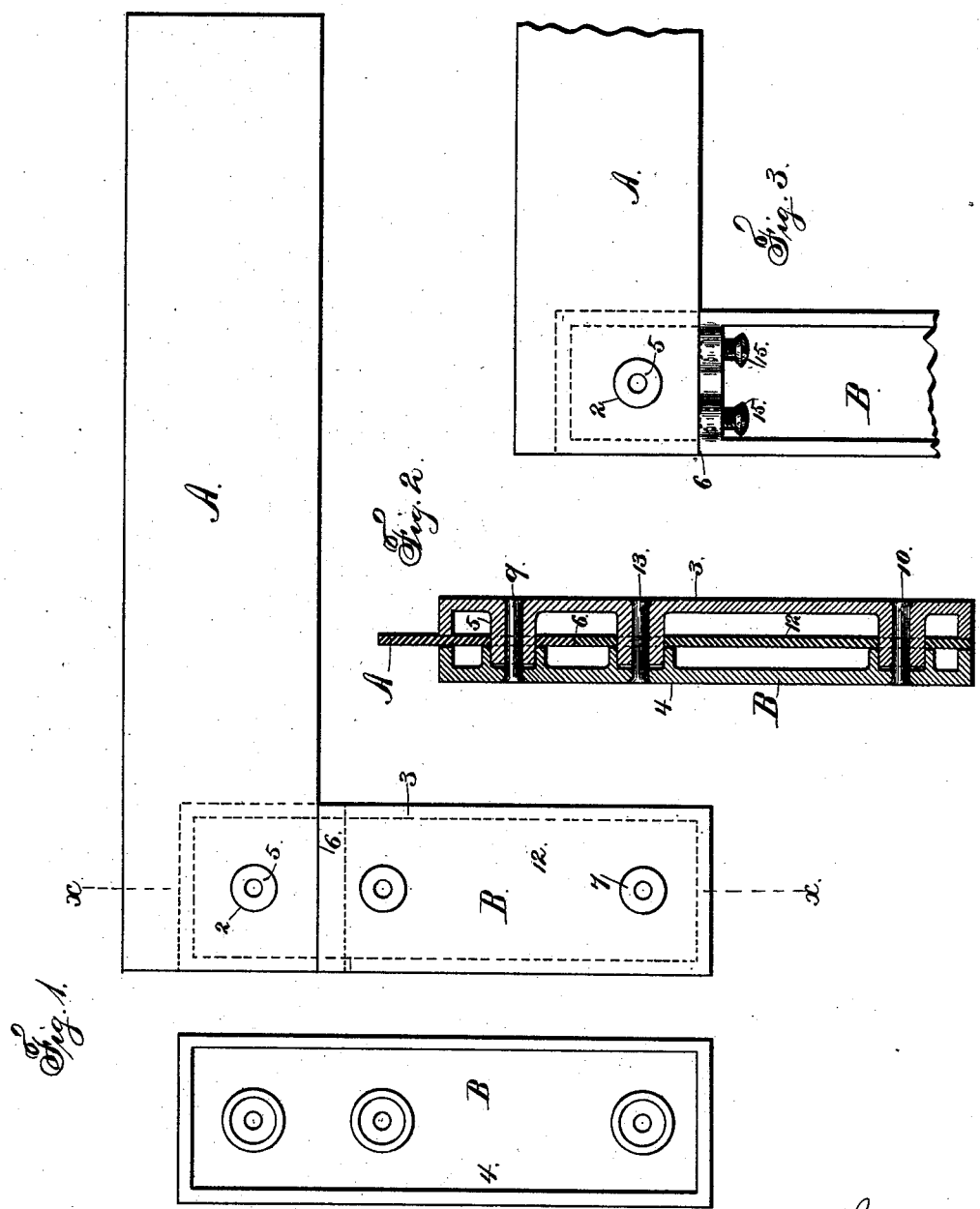

UNITED STATES PATENT OFFICE.

RANDOLPH HAYDEN, OF HADDAM, CONNECTICUT.

TRY-SQUARE.

SPECIFICATION forming part of Letters Patent No. 392,426, dated November 6, 1888.

Application filed March 26, 1888. Serial No. 268,492. (No model.)

*To all whom it may concern:*

Be it known that I, RANDOLPH HAYDEN, of Haddam, in the county of Middlesex and State of Connecticut, have invented an Improvement in Try-Squares for Carpenters, Machinists, and Others, of which the following is a specification.

Try-squares have heretofore been made with a blade of sheet metal, the edges of which are accurately trued, and such blade has been received into a head-piece, sometimes slotted for its reception and sometimes made in two parts set together, and such blade has usually been held in place by rivets passing through both the head and the blade; but in practice it is found that in the riveting operation the blade is very liable to become untrue and out of square with the head. An effort has been made to overcome this difficulty by soldering the blade into the head; but in so doing the expansion by heat is liable to render the blade out of true, and the soldering is not strong, and the blade is liable to become loose.

My present invention is intended to obviate these difficulties; and it consists in the combination, with the blade having a hole through the same at its intersection with the head, of the head-piece having a stud that passes into said hole in the blade and a square shoulder upon the head, against which one edge of the blade is pressed forcibly in the act of passing the blade into its place and pressing it over the stud. I also construct a head-piece in the peculiar manner hereinafter described.

In the drawings, Figure 1 is a plan view of the try-square with the cap-plate of the head removed. Fig. 2 is a section through the head at the line *x x*, Fig. 1; and Fig. 3 is a partial plan showing a modification in the construction of the head.

The blade A is to be of any desired size or length, and it is to be provided with a hole, 2, near one end at that portion of the blade that passes into the head B. This head B is made of two parts, the portion 3 being adapted to receive the blade and the portion 4 to form a cap for the same, so that both sides of the head corresponds in shape at the opposite sides of the blade, and the parts of this head are preferably of metal and cast hollow. Upon the part 3 of the head is a stud, 5, the size of which corresponds, or nearly so, to the size of the hole 2 in the blade A, and there is a transverse shoulder, 6, across the head, which shoulder is to be formed by a suitable tool or machine, so as to be square across such head and perfectly true, and the distance between this shoulder and the stud 5 is to be such that when the blade A is applied with one edge thereof against this shoulder 6 the stud 5 will pass through the hole 2 in the blade A; but in forcing the blade down flat against the part 3 of the head-piece sufficient force will have to be applied to cause the edge of the blade A to bind or press very firmly against the shoulder 6. This is more easily accomplished by having the hole 2 slightly larger than the size of the stud 5, and having such hole bored in the blade A in such a position that the metal is slightly wider between the hole and the edge of the blade than the distance between the shoulder 6 and the stud 5, so that when the blade is held with its edge against the shoulder 6 it can be forced down into its place; but the side of the stud 5 nearest to the shoulder 6 will slightly bed itself into the metal of the blade A, and thereby render the parts perfectly tight and hold the blade from moving laterally within the head.

The cap portion 4 of the head is adapted to receive the projecting upper end of the stud 5, and by preference there is a second stud, 7, entering the recess in the under side of the portion 4 of the head, so as to hold the parts 3 and 4 accurately in position, the one to the other, and it is preferable to face off the adjacent surface of the parts 3 and 4, and turn off the exterior surface of the studs 5 and 7, and bore out the recess in the part 4 of the head-piece, and set such parts together, and then true off the exterior surface of the head, and then dress the shoulder 6 true to the exterior surface of the head, so as to prepare the head for the reception of the blade A, as before described, and there are to be holes through the head at the studs 5 and 7 for the reception of rivets or screws 9 and 10, whereby the parts of the head will be firmly secured together.

In some instances a separate plate, corresponding in thickness to the thickness of the blade A, will be introduced between the two parts 3 and 4 of the head, as seen in Fig. 2, such plate 12 being held by the stud 7 and by a second stud, 13, and the end of the plate 12 adjacent to the blade A forms the shoulder 6, the manner in which the parts are prepared and put together remaining the same as before described.

Should it be desired to make provision for adjusting the blade A in case of any inaccuracy in the shoulder 6, screws 15 will be applied, so as to pass through the metal at the shoulder 6, with their ends in contact with the edge of the blade A. By the setting up of these screws the blade A can be adjusted so as to be perfectly square with the head-piece B, and these screws may be used to compensate any looseness that might otherwise exist of the blade between the shoulder 6 and the stud 5.

I claim as my invention—

1. The combination, with the blade A, having a hole, 2, through the same near one end, of the head B, having the stud 5 and shoulder 6, against which one edge of the blade A is held firmly by the stud passing through the hole in the blade, substantially as set forth.

2. The combination, with the blade A, having a hole through the same near one end, of the head B, made in two parts, and the studs 5 and 7 and screws or rivets by which the two parts of the head are connected together, there being a shoulder, 6, against which one edge of the blade A is pressed by the action of the stud 2 as the blade is introduced into place, substantially as set forth.

3. The combination, with the blade A, having a hole through the same near one end, of the head-piece B, made in two parts divisible centrally upon the line of the blade and united together, there being a stud at 5 and a shoulder, 6, upon one of the parts at right angles to the edge of the head, and the screws 15, passing through such shoulder 6 and against the edge of the plate, substantially as set forth.

4. The head-piece B, made of two parts, 3 and 4, and hollow, there being studs upon one part passing into recesses upon the other part, and rivets or screws to connect the parts together, in combination with the blade A, introduced between the two parts and held in place, substantially as set forth.

Signed by me this 17th day of March, 1888.

RANDOLPH HAYDEN.

Witnesses:
EDWARD W. HAZEN,
ARNOLD H. HAYDEN.